(12) United States Patent
Lu et al.

(10) Patent No.: US 6,483,605 B1
(45) Date of Patent: Nov. 19, 2002

(54) METHOD FOR TRANSFORMING AN IMAGE FROM A RESOLUTION TO A LOWER RESOLUTION

(75) Inventors: Ai-Chieh Lu, Taipei (TW); Fong Lien, Taipei (TW)

(73) Assignee: Destiny Technology Corporation, Taipe (TW)

( * ) Notice: Subject to any disclaimer, the term of this patent is extended or adjusted under 35 U.S.C. 154(b) by 0 days.

(21) Appl. No.: 09/454,547

(22) Filed: Dec. 7, 1999

(51) Int. Cl.[7] ............................................. G06K 1/100
(52) U.S. Cl. .................... 358/1.2; 358/1.3; 358/1.9; 382/260
(58) Field of Search .................. 358/1.2, 1.3; 382/260, 382/299, 300, 1.6, 1.9

(56) References Cited

U.S. PATENT DOCUMENTS 6,075,926 A * 6/2000 Atkins et al. ................ 358/1.2

* cited by examiner

*Primary Examiner*—Mark Wallerson
*Assistant Examiner*—Twyler Lamb
(74) *Attorney, Agent, or Firm*—Powell Goldstein Frazer & Murphy LLP

(57) ABSTRACT

A method for transforming a source image into a target image with the original resolution N time to the target resolution is disclosed. The original image data of pixels is read and stored for N scan lines and grouped into a series of matrices each including $N^2$ pixels. The matrices are then classified into various matrix types defined previously, wherein matrices with different numbers of original dots are classified as different matrix types. The target image is formed with a plurality of target units each determined based on one corresponding matrix. In general, a target unit is drawn with target dots having a larger total area when its corresponding matrix includes a larger number of the original dots.

20 Claims, 3 Drawing Sheets

METHOD FOR TRANSFORMING AN IMAGE FROM A RESOLUTION TO A LOWER RESOLUTION

FIELD OF THE INVENTION

The present invention relates to a method for transforming image data from a higher resolution to a lower resolution.

BACKGROUND OF THE INVENTION

There are some kinds of display equipment such as printers or digital copiers, which are constructed and designed to produce an image on paper or other print materials by placing dots in virtual positions referred to as pixels and defined by a digital raster.

The dots on the pixels are produced on the print material with a marking engine. The marking engine imparts clusters of energy to the surface of a display medium with, for example, a laser beam. The surface of the display medium is generally formed of material that can be charged or discharged such as photoconductive materials. The clusters of energy can discharge the positions or pixels of the charged medium surface which the laser beam scans, and a charge pattern is thus formed. The charge pattern is subsequently developed by attracting toner to it, and then transferred to the print material such as paper.

To form a complete charge pattern on the medium surface, the marking engine sequentially scans the surface following a series of scan lines in each of which the pixels lie. The laser beam scans these pixels one by one to selectively mark dots in desired pixels. After development and transference, those dot patterns are displayed on the print material to show an image as a whole. The resolution of a displayed image is defined with the number of the pixels, in each of which a dot can be marked or can be left blank, that can be displayed within a unit dimension, such as dots per inch ("DPI"). Higher resolution indicates smaller dot size and higher dot number per unit dimension.

In general, the resolution along the direction in which the scan lines extend can be controlled according to the minimum time interval between the laser being turned on and off, and this minimum time interval can be controlled as small as desired related to the tolerance of human eye. A shorter minimum time interval will result in a dot with smaller dimension and therefore a higher resolution along the direction in which the scan lines extend. On the other hand, the resolution along the direction perpendicular to the scan line, which depends on the number of the scan lines per unit dimension, is generally fixed and determined by the interplay between the paper moving mechanism and the laser scanning speed. This fixed one is usually referred to as the resolution of the display equipment.

Sometimes, image data is transmitted between equipment with different resolutions. For example, the image data may be transmitted from a low-resolution scanner to a high-resolution printer, or on the contrary from a high-resolution scanner to a low-resolution printer. In the latter situation, the image data, must be transformed from the original resolution to a lower target resolution to meet the performance that a terminal equipment can provide. Therefore, a method to implement this resolution transformation is required.

SUMMARY OF THE INVENTION

The present invention proposes a novel method to transform a source image into a target image with the original resolution N time to the target resolution. Firstly, the original image data of pixels is read and stored for N scan lines. This image data of original pixels is then grouped into a series of matrices each including $N^2$ pixels having a dimension substantially coinciding with that of the target unit.

Subsequently, the matrices are classified as one of various matrix types defined previously according to the data of the original pixels in the matrix, wherein matrices with different numbers of original dots should be classified as different matrix types. Thereafter, target image is formed with a plurality of target units each determined based on respective corresponding matrix.

To form the target image, a target unit is drawn with target dots having a larger total area when its corresponding matrix includes a larger number of the original dots. A target unit is drawn with one target dot having a width no less than that of the unit itself when its corresponding matrix includes $N^2$ original dots. A target unit is drawn with no target dot when its corresponding matrix includes no original dot.

For a preferred embodiment with N equal to 2, there can be one target dot in a target unit or two target dots respectively located at the left and right sides of the unit. For the case of one target dot, the target dot is biased to the left side when the corresponding matrix includes more original dots on the left side than on the right side. Alternatively, the target dot is biased to the right side when the corresponding matrix includes more original dots on the right side than on the left side. For the case of two target dots, the target dot at the left side is larger than the one on the right side when the corresponding matrix includes more original dots on the left side than on the right side. Alternatively, the target dot at the left side is smaller than the one on the right side when the corresponding matrix includes more original dots on the right side than on the left side.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figures 1, 2:
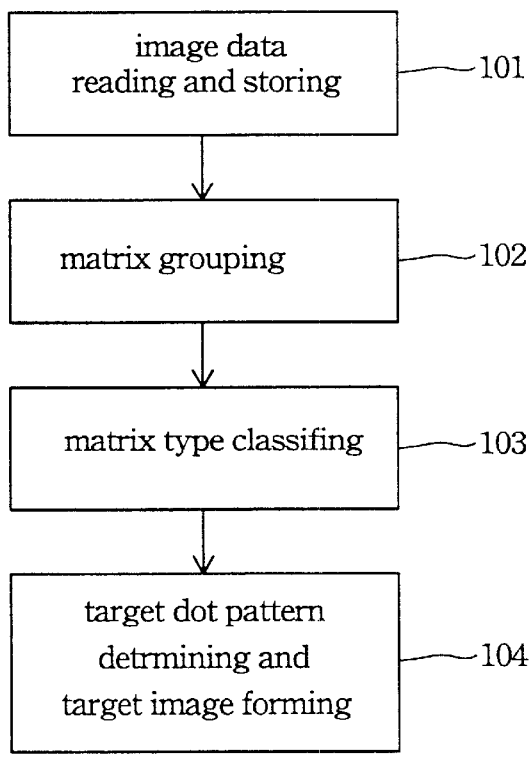
FIG. 1 is a flow chart showing the steps of transforming the image according to the present invention.
FIG. 2 is a table to show the classified matrix types and corresponding matrix patterns according to the present invention.

FIG. 1 shows the flow chart of the present invention to transform a source image with an original resolution into a target image with a reduced target resolution. The original image is constructed with groups of pixels lying on a series of original scan lines. Each of the pixels is assigned a status either marked with an original dot or unmarked with a blank left. The status of those pixels is digitized and transmitted as digital data.

With the desired reduced target resolution, the target picture units constituting the target scan lines and thereby the target image must have a dimension greater than that of the original pixels, also the target scan lines have a pitch greater than that of the original scan lines. In other words, one target picture unit will cover more than one original pixel, as well as one target scan line will cover more than one original scan line. For an original resolution which is N times the target one as a general case (N is an integer greater than one), the target picture units will be formed with N-times vertical dimension to the original pixel. Thus, to deal with the image corresponding to a target unit, the original image data, indicating if each original pixel is marked with an original dot or not, must be read and stored for more than, or equal to, N scan lines (Step 101).

Thereafter, the original pixels are grouped into a plurality of matrices such that the size of each matrix substantially coincides with that of the desired target picture unit (Step 102). The number of the original pixels included in a matrix depends upon the ratio of the areas of a target picture unit to an original pixel, which is corresponding to, and preferably square of, the ratio of the original resolution to the target resolution. For the general case of N-times original resolution, there are preferably square of N original pixels included in a matrix, and these original pixels are equally distributed on N original scan lines, that is, every N pixel on each original scan line is grouped into a matrix of $N^2$ pixels. In one embodiment for a target resolution half of the original one, four adjacent original pixels equally distributed on two scan lines are included in a matrix.

After being constructed by grouping the original pixels, the matrices of original pixels are classified as one of various "matrix types" defined previously according to the data of the original pixels in a matrix (Step 103). Each matrix type defines a specific configuration of original image data of pixels in a matrix, and each configuration of data may include one or more arrangements related to some specific characteristics. In one preferred embodiment, the most important characteristic of a matrix type is the number of the pixels marked with an original dot in a matrix, which is also the number of the original dots marked in the matrix. Matrices with different numbers of marked original dots should be classified as different matrix types. In a further embodiment, matrices including totally the same number of original dots could be further classified according to the distribution of the original dots.

When the matrix type of the current matrix is classified and recognized as the current matrix type, a corresponding unit pattern for the target unit is determined, and the target image is then constructed with all the target unit located on every target scan line (Step 104). The unit pattern corresponding to each matrix type is designed in advance according to the number and the distribution of the original dots in the matrix. In general, the total area of the target dots in a unit pattern is substantially proportional to the number of original dots in the corresponding matrix. That is, a unit pattern is drawn with target dots having a larger total area when its corresponding matrix includes a larger number of original dots. When the corresponding matrix includes $N^2$ original dots for the N-times original resolution, the unit pattern of the target unit is drawn with one target dot having a width no less than that of the unit itself. When the corresponding matrix includes no original dots, the unit pattern of the target unit is drawn with no target dot.

In addition to one target dot in one target unit, the unit pattern can also be designed with a plurality of target dots (or named sub-dots) having respective widths, as well as areas, less than that of the unit. The position distribution of the target dots or sub-dots can be further regulated according to different position distribution of the original dots in the matrix. The target dots or sub-dots with width less than that of the unit can be achieved by specific driving signals with specific waveforms having two-state outputs that are divided into a number of base time intervals during a unit period that the energy source scans through a target unit. The output of a driving signal at each base time interval can be at enabling state or at disabling state. The longer a continuous enabling state lasts, the wider and larger the produced target dot is. The length and therefore the number of the base time intervals during a unit period can be adjusted as desired to control the dot width drawn in the unit. Therefore, in a target unit, the total area of a target dot (sub-dot) is substantially proportional to the number of the base time intervals that the output of the driving signal is at enabling state. Adjusting the waveform of the driving signal for each base time interval can control the area of the target dot in a target unit to meet the demands.

Figure 3:
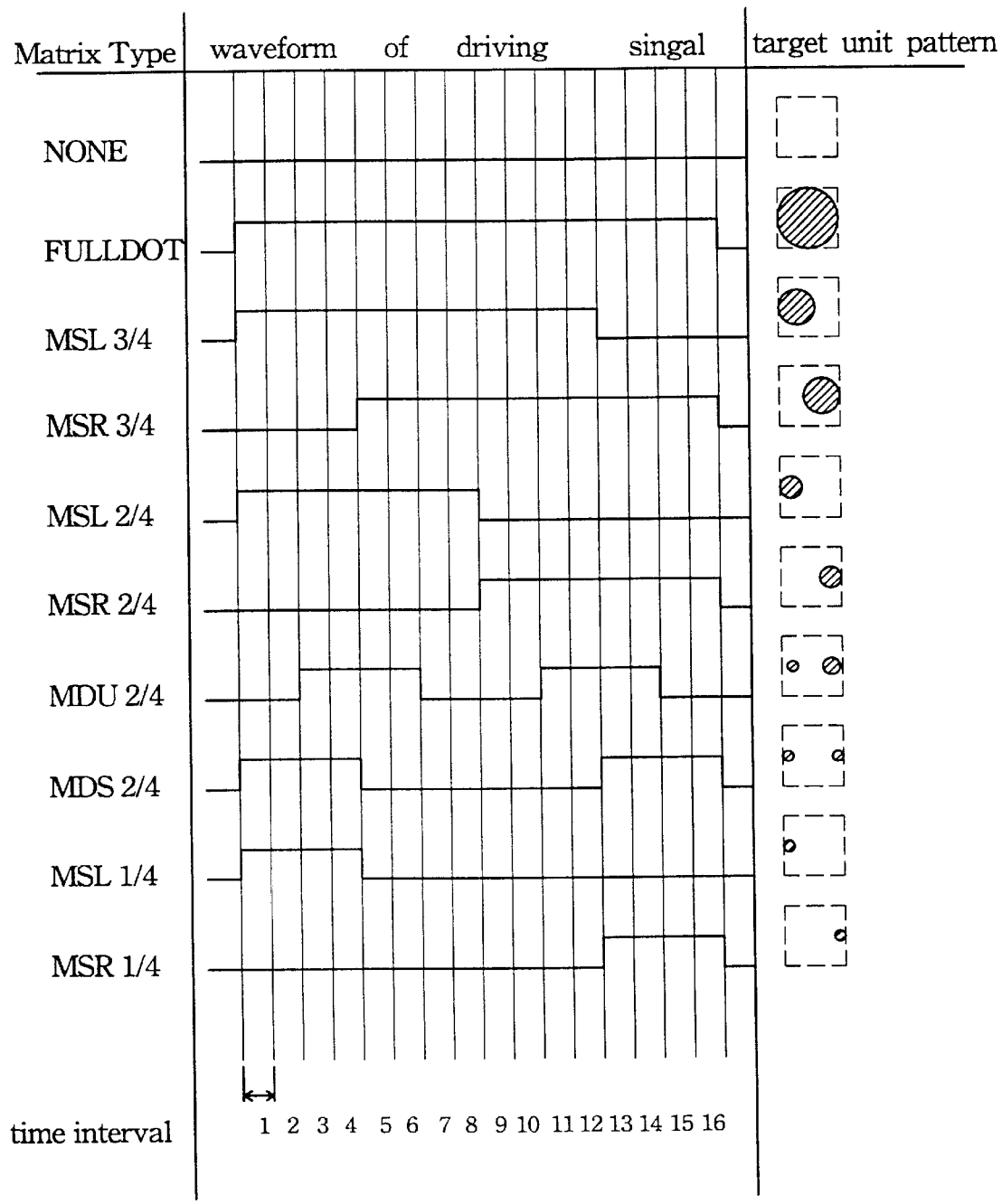
FIG. 3 is a table to show the classified target unit pattern and corresponding waveform of the driving signal for each matrix type according to the present invention.

FIG. 2 and FIG. 3 illustrate a preferred embodiment to transform an image to its half resolution, for example, from 1200 DPI to 600 DPI. In this preferred embodiment, to deal with the pixels located along one target scan line, the original image data of pixels must be read and stored for at least two original scan lines (Step 101). Four adjacent original pixels located in two original scan lines are grouped into a matrix (Step 102). All the sixteen kinds of different matrices are classified into five or ten matrix types shown in FIG. 2 according to the number and positions of the original dots therein (Step 103).

As shown in FIG. 2, a matrix including four pixels can be firstly classified into five matrix types simply according to the number and positions of the original dots. Accordingly, the matrix type with four original dots in a matrix is named FULLDOT, three original dots in a matrix named M3/4, two original dots in a matrix named M2/4, one original dot in a matrix named M1/4, and no original dot named NONE. The matrix types of M3/4, M2/4, and M1/4 can be further classified in accordance with the positions of original dots. The matrix type of M3/4 can be further classified into two types of MSL3/4 and MSR3/4. The matrix type of MSR3/4 has three original dots with two at the left and one at the right side. The matrix type of MSL3/4 has three original dots with two at the right and one at the left side. Similarly, the matrix type of M2/4 can be further classified into three or four types of MSL2/4, MSR2/4, MDU2/4 and MDS2/4. These four types respectively have two original dots at the left, two at the right, two at top half or bottom half, and two at the ends of a diagonal. The latter two matrix types of MDU2/4 and MDS2/4 can alternatively be classified as one type. The matrix type of M1/4 can also be further classified into two types of MSL1/4 and MSR1/4, only one original dot located on the left and the right side respectively.

After the matrix type of the current matrix is classified, the target unit pattern is determined with a driving signal having specific waveform during a unit period (Step 104). A preferred embodiment of those unit patterns and corresponding waveforms to those matrix types shown in FIG. 2 is displayed in FIG. 3. In this embodiment, the waveform of a driving signal is divided into sixteen base time intervals during a unit period for providing a minimum width of a target dot approximate one-sixteenth of a full-dot. In other embodiments, different numbers of the base time intervals divided within a unit period can alternatively be employed.

However, in the embodiment shown in FIG. 3, those waveforms have their respective configurations for the enabling or disabling state for each base time interval, wherein the enabling state is represented with the high state, and the disabling state is the low one. As can be seen in FIG. 3, the waveform corresponding to matrix type of NONE has no enabling state for every base time interval, and that will produce blank without any target dot in the corresponding target unit. The waveform corresponding to matrix type of FULLDOT has all of the base time intervals at the enabling states and will produce in the target unit a full-dot having a width no less than that of the unit itself. The waveform corresponding to matrix type MSL3/4 has enabling states in the first through the twelfth (first three-fourth) base time intervals and disabling states in the others (later one-fourth), and will produce a target dot located at the left side of the target unit with area roughly three-fourth of that of the full-dot. The waveform corresponding to matrix type of MSR3/4 has enabling states in the fifth through the sixteenth base time intervals and disabling states in the others, and will produce a target dot located at the right side of the target unit with area approximately three-fourth of that of the full-dot.

For the waveforms corresponding to matrix types of MSL2/4 and MSR2/4, the enabling states respectively appear at the first half and the later half of their unit periods. Consequently, both target dots are about half area of the full-dot and respectively located on the left and right sides of their target units. For the waveforms corresponding to matrix types of MDU2/4 and MDS2/4, the enabling states appear totally at half of their base time intervals during their unit periods. Consequently, two target dots are produced on their target units with total area about half of the full-dot and located substantially at the two ends of their target units. For the waveforms corresponding to matrix types of MSL1/4 and MSR1/4, the enabling states respectively appear at the first one-fourth and the later one-fourth of their unit periods. Consequently, both target dots are about one-fourth area of the full-dot and respectively located at the left and right ends of their target units.

Figure 4:
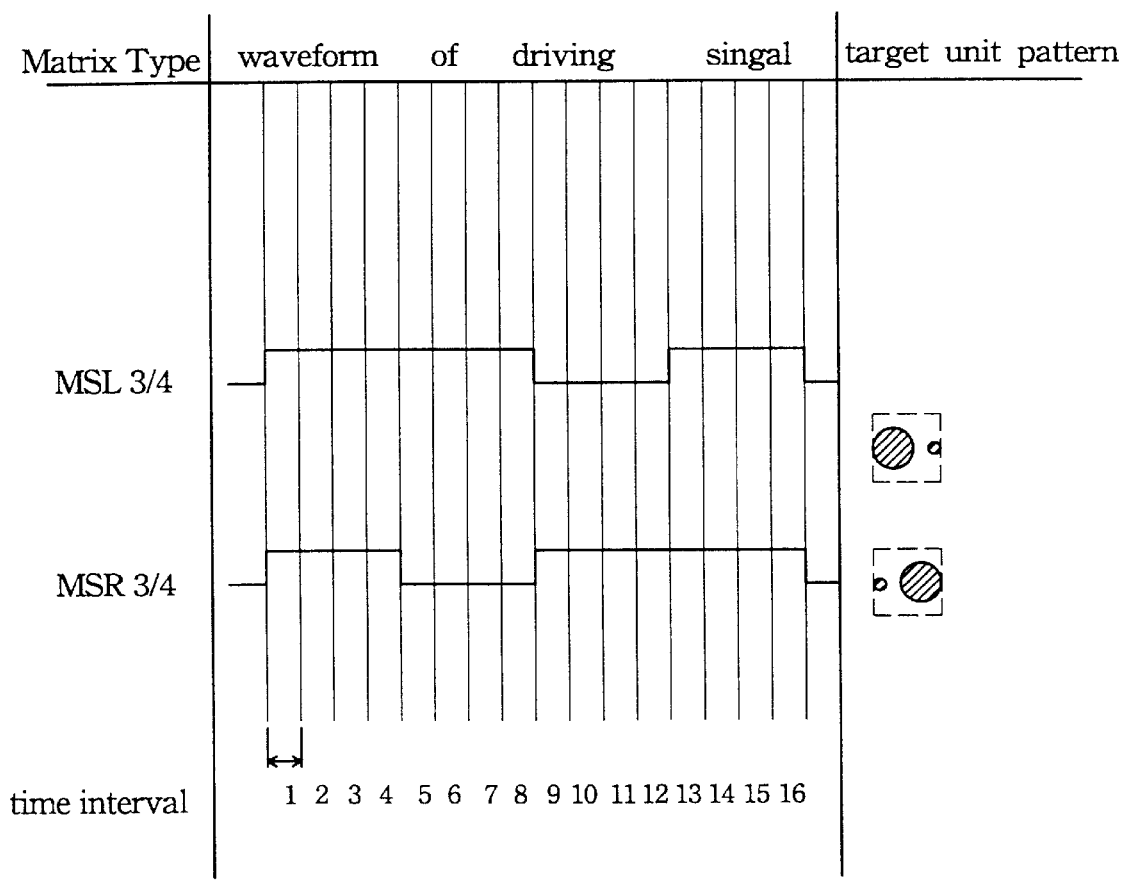
FIG. 4 is a table to show the classified target unit pattern and corresponding waveform of the driving signal for two matrix types according to the present invention.

FIG. 4 shows another embodiment that forms two target dots in the target units for the matrix types of MSL3/4 and MSR3/4. The waveform of MSL3/4 in this embodiment has enabling states at the first half and the later quarter base time intervals within a unit period. Two target dots are respectively formed in a target unit with areas about half and quarter of the full-dot and located on the left and the right sides of the target unit. The waveform of MSR3/4 has enabling states at the first quarter and the later half base time intervals within a unit period. Two target dots are respectively formed in a target unit with areas about quarter and half of the full-dot and located in the left and the right sides of the target unit.

As described above, the present invention provides an image transformation method between an original resolution and a reduced target one. With the present method, the original image is transformed to the target image with a certain number of the original pixels forming a matrix as an original transformation element. The target unit having the same dimension to the matrix is formed as a target transformation element with approximately the same marked area (dot area). The same ratio of the totally marked area to the unmarked area can be substantially held from the original image to the target one. Therefore, substantially the same gray level effect for human's vision can be kept. Furthermore, with the simple correspondence of signal waveform to matrix type, the transformation can be implemented with economic equipment demand and high executing speed.

As is understood by a person who is skilled in the art, the foregoing preferred embodiments of the present invention are illustrated for descriptive purpose and shall not limit the scope of the present invention. It is intended to cover various modifications and similar arrangements within the scope of the present invention by means of the appended claims, the scope of which should be accorded the broadest interpretation so as to encompass all such modifications and similar structure.

What is claimed is:

1. A method for transforming an original image with an original resolution to an target image with a target resolution, wherein said original resolution is N times of said target resolution and N is an integer greater than one, said method comprising the following steps:

storing data of said original image for N original scan lines, each of said original scan lines including a plurality of pixels, each of said pixels being in a status selected from the group consisting of marked status wherein it is an original dot and an unmarked status wherein it is a blank;

grouping every N pixels of each of said N original scan lines into a matrix of $N^2$ pixels, thereby dividing said original image into a plurality of matrices; and forming said target image with a plurality of target scan lines, each of said target scan line including a plurality of units, each of said units being determined based on a corresponding one of said matrices.

2. A method according to claim 1, wherein one of said unit is drawn with one target dot having a width no less than that of said unit itself when its corresponding matrix includes $N^2$ original dots.

3. A method according to claim 1, wherein one of said unit is drawn with target dots having a larger total area when its corresponding matrix includes a larger number of said original dots.

4. A method according to claim 1, wherein one of said units is drawn with no target dot when its corresponding matrix includes no original dot.

5. A method according to claim 1, wherein N is 2.

6. A method according to claim 5, wherein one of said unit is drawn with one target dot having a width no less than that thereof when its corresponding matrix includes $2^2$ original dots.

7. A method according to claim 5, wherein one of said unit is drawn with target dots having a larger total area when its corresponding matrix includes a larger number of said original dots.

8. A method according to claim 7, wherein there is one target dot.

9. A method according to claim 8, wherein said target dot is biased to the left side when said corresponding matrix includes more original dots on the left side than on the right side.

10. A method according to claim 8, wherein said target dot is biased to the right side when said corresponding matrix includes more original dots on the right side than on the left side.

11. A method according to claim 7, wherein there are two target dots respectively located on the left and right sides of said unit.

12. A method according to claim 11, wherein said target dot on the left side is larger than said target dot on the right side when said corresponding matrix includes more original dots on the left side than on the right side.

13. A method according to claim 11, wherein said target dot on the left side is smaller than said target dot on the right side when said corresponding matrix includes more original dots on the right side than on the left side.

14. A method according to claim 1, wherein one of said unit is drawn with no target dot when its corresponding matrix includes no original dot.

15. A method for transforming an original image with an original resolution to an target image with a target resolution, wherein said original resolution is N times of said target resolution and N is an integer greater than one, said method comprising the following steps:

storing data of said original image for N original scan lines, each of said original scan lines including a plurality of pixels, each of said pixels being in a status selected from the group consisting of marked status wherein it is an original dot and an unmarked status wherein it is a blank;

grouping every N pixels of each of said N original scan lines into a matrix of $N^2$ pixels, thereby dividing said original image into a plurality of matrices; and forming said target image with a plurality of target scan lines, each of said target scan line including a plurality of units, each of said units being determined based on a corresponding one of said matrices, wherein one of said unit is drawn with target dots having a larger total area when its corresponding matrix includes a larger number of said original dots.

16. A method according to claim 15, wherein one of said unit is drawn with one target dot having a width no less than that thereof when its corresponding matrix includes $N^2$ original dots.

17. A method according to claim 15, wherein one of said units is drawn with no target dot when its corresponding matrix includes no original dot.

18. A method according to claim 15, wherein N is 2.

19. A method according to claim 18, wherein there is one target dot, said target dot being biased to one side when said corresponding matrix includes more original dots on one side than on the other side.

20. A method according to claim 18, wherein there are two target dots, said two target dot are different in size when said corresponding matrix includes more original dots on one side than on the other side.

* * * * *